May 2, 1950 — O. JACOBSEN — 2,505,970
PLUG VALVE
Filed June 24, 1944
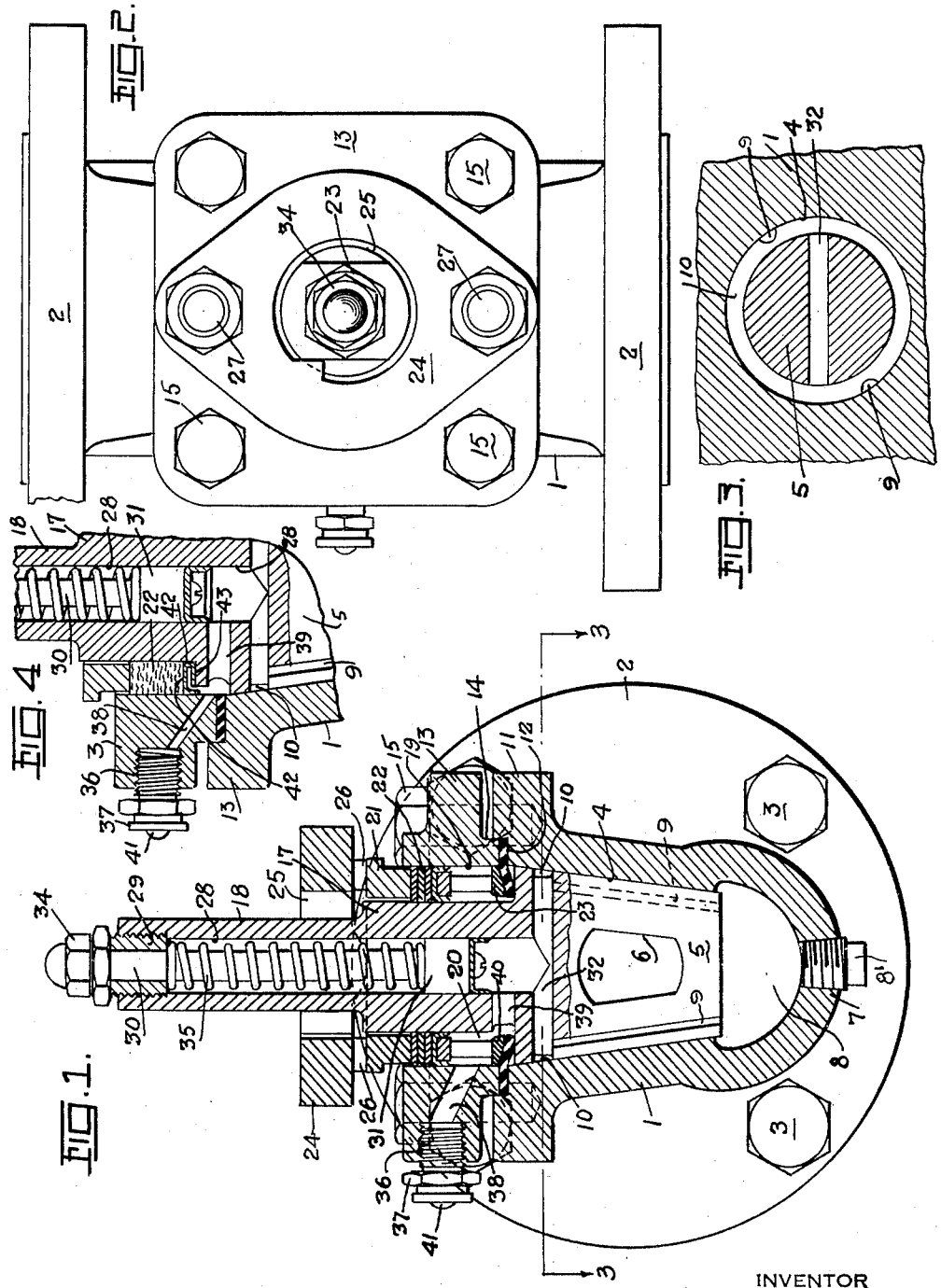
INVENTOR
OYSTEIN JACOBSEN.
BY
Toulmin & Toulmin
ATTORNEYS Patented May 2, 1950

2,505,970

UNITED STATES PATENT OFFICE 2,505,970

PLUG VALVE

Oystein Jacobsen, Montgomery County, Ohio, assignor to The Duriron Company, Inc., Dayton, Ohio, a corporation of New York Application June 24, 1944, Serial No. 541,858

1 Claim. (Cl. 251—93)

The present invention relates to valves for controlling the flow of fluids and more particularly to those valves of the plug cock type.

It is customary in valves of this character to employ a lubricating system by which the lubricant is applied to the bearing surfaces at the valve seat. The lubricant is usually contained in a reservoir and is subjected to pressure by a set screw or other suitable device to force the lubricant through passageways that are provided in the plug and/or in the coupling body at the position of the valve seat. These passageways usually take the form of grooves which extend diametrally around the plug and interconnect with grooves that extend longitudinally of the plug and terminate in the lubricant reservoir. In certain cases grooves are also provided in the valve body to cooperate with the lubricating effect offered by the grooves in the plug.

In view of the fact that a certain amount of leakage has been caused between the plug and its seat when the valve is being operated between its closed and open positions, it has been proposed to provide a lubricant reservoir in the plug which communicates with the grooves and passageways and contains a spring pressed piston by which to maintain the lubricant under constant pressure and thus continually to supply lubricant to the seating surface of the valve.

This reservoir is usually contained in the stem portion of the plug and is supplied with lubricant through a pressure gun or other suitable means applied to the valve casing near the lower or small end of the plug. Under these conditions the lubricant must be forced through the entire length of the longitudinal and diametral grooves before reaching the piston-containing reservoir. In case there is any used or contaminated lubricant in any of these grooves, this lubricant is caused to collect in the reservoir to be later supplied to the lubricating system in conjunction with fresh lubricant which may have been forced into the reservoir during the lubricant changing operation. Thus the used or contaminated lubricant may deleteriously affect the fresh lubricant, tending to reduce its lubricating quality, which in turn results in greater friction and shorter life of the plug and/or its seat.

The primary object of the invention is to provide an improved valve and plug construction by which fresh and unused lubricant can be supplied directly to the pressure reservoir within the plug and thereby assure the replenishment of uncontaminated lubricant to the lubricating system including the grooves and passageways within the plug and the casing.

The invention will be better understood when reference is made to the following description read in connection with the accompanying drawings in which Fig. 1 represents a vertical sectional view of the improved valve structure. Fig. 2 is a top plan view showing the general outline of the exterior parts. Fig. 3 is a fragmentary cross-sectional view taken along line 3—3 in Fig. 1 and Fig. 4 shows a fragmentary longitudinal sectional view of a modified construction.

Referring to Fig. 1, reference character 1 designates the side walls of the main valve casting which terminates at each end in a coupling flange 2 provided with bolts for securing the valve between the separate ends of a pair of conduits through which the fluid (liquid) to be controlled passes. The valve casting is provided with a conically shaped opening which extends at right angles to the openings through the conduits and is adapted to rotatably receive the plug portion of the valve.

This plug is provided with a transversely extending opening 6, the arrangement being such that when this opening is in line with the openings in the conduit, the valve is in open position.

The casting 1 is provided with an integrally connected extension 7 which forms a compartment or chamber 8 having a clean-out fitting 8.

The plug 5 is provided with a pair of oppositely disposed longitudinally extending grooves, at least one of which communicates with the compartment 8. In addition, there may be provided a circumferential groove 10 at the top of the plug which serves to interconnect the longitudinal grooves 9 so that the peripheral surface of the plug is well covered with grooves or passageways through which a lubricant can be forced in the manner which will be described hereinafter.

The upper end of the valve casting 1 terminates at the top in a shouldered flange 11, this flange being positioned at about the same height as the upper surface of the plug. A gasket of acid-proof material may be contained within the shouldered recess of the flange to prevent leakage of fluid at the joint.

A rectangularly shaped cover plate 13 having a shouldered portion 14 may rest on the gasket 12 and is bolted to the flange 11 at four places as indicated at 15. The shoulder portion 14 has a height somewhat greater than the distance of the recess in the flange 3 so as to leave an annular recess 16 directly above the uppermost surface of the flange and thereby assure a tight joint at the gasket 12 when the bolts 15 are tightened.

The plug 5 terminates at its upper end in shouldered shaft portions 17, 18 the diameter of the shaft portion 17 being considerably less than the diameter of a bore 19 immediately surrounding the shaft so as to leave an annular space indicated at 20. There is a gland member 21 loosely fitted within this annular space and resting on a plurality of layers of packing material 22. This material may be supported on a so-called cage ring 23 which in turn rests on the inner annular portion of the gasket 12. In order to apply pressure to the gland member 21 a clamp plate 24 is provided directly over the gland 21 and having an opening 25 sufficiently large to clear the shoulder portion 17 of the plug stem. The plate 24 is provided with a pair of diametrally disposed projections 26 which bear against the upper surface of the gland member.

The clamp plate 24 may be bolted as indicated at 27 to the plate 13 and on tightening the two bolts the projections 26 force the gasket 21 downwardly against the packing material 22 and thus prevent leakage of fluid at the edges of the packing.

The shaft portions 17, 18 of the plug are provided with an axially extending bore 28 which is plugged at the top by a bushing 29. The latter has a centrally disposed opening slidably to receive a rod 30 which terminates at the bottom in a piston 31 and is adapted freely to slide along the bore. The latter extends downwardly to a distance just below the circumferential groove 10 and there is an opening 32 extending diametrally across the middle of the plug and communicating at its ends with the groove 10 and at its middle position with the lower end of the bore 28.

The rod 30 terminates at the top in a nut 34 which serves to limit the downward movement of the rod. A compression spring 35 surrounds the rod 30 and is positioned between the lower surface of the bushing 29 and the rear face of the piston 34. The function of the spring is continuously to urge the piston 31 downwardly against a lubricant material which is contained in the lower portion of the bore 28. This material is introduced into the centrally disposed reservoir in a manner which will now be described.

The cover plate 13 at one side thereof is provided with a threaded opening 36 for receiving a self-sealing fluid injection fitting 37 (preferably of the Alemite type) and this bore communicates through a diagonally extending opening 38 with the space contained within the cage ring 20. There is an opening 39 extending through the portion 17 of the plug stem at a position directly below the cage ring and communicating with the lower end of the bore 28. The lower portion 40 of the cage ring may be nicked or chipped at a position immediately adjacent the opening 39 so that communication is established through the diagonal opening 38, the cage ring 20 and the opening 39 to that portion of the bore 28 below the piston 31.

Thus, when the check valve 41 of the fitting 37 is depressed by a lubricant pressure gun, lubricant is forced through the opening 36, cage ring 20, opening 39 into the lower portion of the bore 28. At this point the lubricant can flow in two directions, either upwardly against the piston 31 to elevate the latter against its spring or else through the opening 32, to the circumferential groove 10, thence into the longitudinal grooves 9, finally reaching the compartment 8.

In practice the latter is usually filled with lubricant by hand before the plug 5 is inserted so that most of the lubricant injected through the fitting 37 forces the piston 31 upwardly.

The rod 30 is caused to be elevated carrying with it the nut 34 which serves as a tell-tale in showing the position of the piston, and therefore giving an indication of the amount of lubricant in the chamber immediately below the piston.

It is apparent that as the lubricant in the grooves 9 and 10 is used up during the angular movement of the plug 5 from the valve-open to valve-closed position and vice versa, additional fresh lubricant is supplied to these grooves by reason of the pressure applied to the lubricant in bore 28. It will be particularly noted that none of the used lubricant which has already reached the grooves 9 and 10 can find its way back into the chamber 28 because the piston 31 is continuously acting to force lubricant in a single direction out of the chamber and there can be no reverse movement of the lubricant. The fresh lubricant which is injected into the pressure chamber does not travel through either of the grooves 9 and 10 but instead has its own passageway so that it may be admitted directly into the chamber from the fitting 37.

It will be further noted that the lubricant injecting passageway, except for the cage ring 20 and the opening 39, is contained entirely within the cover plate 13 and may therefore be provided by a manufacturing operation which is separate from any operation performed on either the casing 1 or the plug. By distributing the necessary work over a number of different parts rather than complicating any one part by intricate machine operations, certain economies are effected in the production and assembly of the valve. In view of the fact that the cage ring 20 assures an annular space immediately surrounding the stem portion 17, the opening 39 is always in communication with the opening 38 regardless of the angular position of the plug stem.

In Fig. 4, a modified structure is disclosed in which the corresponding parts have been given similar reference characters so that no further explanation of these parts is deemed necessary.

The main difference between two structures is that in Fig. 4, the cage ring 20 has been eliminated and instead, a cup washer 42 is employed for retaining the packing material 22 in place. This washer is supported on a shoulder 43 formed in the plug 5, this shoulder being of somewhat smaller diameter than the bore 19 formed in the cover plate 13. Thus the underneath side of the washer 42 is exposed to the pressure of the lubricant as it is being injected into the fitting 37 and tends to expand so as to assure no leakage past the packing material. The operation of the valve structure shown in Fig. 4 is similar to that explained in connection with Fig. 1 in that fresh lubricant is forced through the cover plate 13 through the opening 38, the opening 39 in the plug stem and into the opening 28 for applying an upward urge to the piston 31.

While the structural arrangement of the apparatus disclosed and described herein constitutes a preferred form of the invention, it is to be understood that the apparatus is capable of alteration without departing from the spirit of the invention, and that all modifications that fall within the scope of the appended claim are intended to be included herein.

Having thus described my invention, what I claim as new and desire to secure by Letters Patent, is:

In combination, a valve body for controlling the flow or fluid, said body being provided with a main passageway and an angularly positioned bore communicating therewith, a plug within said bore adapted to rotate, said plug being provided with a plug stem of smaller size than the plug, a cover for said valve body surrounding said stem and having an opening considerably larger than the stem so as to leave an annular space and a gland for applying pressure to the packing material, means for lubricating the valve seat, said means including a reservoir centrally disposed within the plug stem and means for filling said reservoir with lubricant, said means including an opening which extends inwardly from the edge of said cover and then under the packing material and thence through the plug stem into the reservoir, and means for supporting the packing material away from said opening but permitting unobstructed access to the lubricant passing through said opening into the reservoir, said last mentioned means comprising a pair of rings spaced from one another by a plurality of spacing elements to leave segmental openings between the rings, said openings forming a substantially peripherally complete passageway for the lubricant, said passageway being in communication with said opening which extends inwardly from the edge of said cover.

OYSTEIN JACOBSEN.

REFERENCES CITED

The following references are of record in the file of this patent:

UNITED STATES PATENTS

| Number | Name | Date |
| --- | --- | --- |
| 1,940,378 | Sutliff | Dec. 19, 1933 |
| 2,021,358 | Greenwood | Nov. 19, 1935 |
| 2,065,726 | Nordstrom | Dec. 29, 1936 |
| 2,299,517 | Volpin | Oct. 20, 1942 |
| 2,332,282 | Volpin | Oct. 19, 1943 |